United States Patent
Stewart et al.

(10) Patent No.: US 10,010,214 B2
(45) Date of Patent: Jul. 3, 2018

(54) COLLAPSIBLE PAN TILT

(71) Applicants: Shane D. Stewart, West Valley City, UT (US); Joanie Steele Stewart, West Valley City, UT (US)

(72) Inventors: Shane D. Stewart, West Valley City, UT (US); Joanie Steele Stewart, West Valley City, UT (US)

( * ) Notice: Subject to any disclaimer, the term of this patent is extended or adjusted under 35 U.S.C. 154(b) by 0 days.

(21) Appl. No.: 15/341,975

(22) Filed: Nov. 2, 2016

(65) Prior Publication Data
US 2018/0116450 A1    May 3, 2018

(51) Int. Cl.
| F16M 11/00 | (2006.01) |
| A47J 36/34 | (2006.01) |
| A47G 23/00 | (2006.01) |
| A47G 29/00 | (2006.01) |

(52) U.S. Cl.
CPC .............. *A47J 36/34* (2013.01); *A47G 23/00* (2013.01); *A47G 29/00* (2013.01)

(58) Field of Classification Search
CPC ................................ A47B 91/12; A47B 91/00
See application file for complete search history.

(56) References Cited

U.S. PATENT DOCUMENTS

| 6,323,406 B1 * | 11/2001 | Park ........................ G10G 5/00 248/434 |
| 7,417,853 B1 * | 8/2008 | Myers .................... F16M 11/38 248/917 |
| 9,010,700 B1 * | 4/2015 | Cooper ................... G10G 5/00 248/166 |
| 9,293,123 B2 * | 3/2016 | Fan ......................... G10G 5/00 |

* cited by examiner

*Primary Examiner* — Amy J. Sterling
(74) *Attorney, Agent, or Firm* — Workman Nydegger

(57) ABSTRACT

A collapsible pan tilt has two or more tilt bases connected to one another by a base hinge. The tilt bases can be relatively long and narrow members that have a flat bottom surface and an angled/tilted top surface. At a proximal end of the tilt bases can be a base hinge connecting the two or more tilt bases together. A single base hinge can connect all of the tilt bases together; alternatively, multiple base hinges can be utilized. A pan stop can be incorporated to stop the pan or other item that is placed on the tilted top surface from sliding down off of the pan tilt. A lid holder can be incorporated in the tilt bases. Additionally, one or more of the hinges can be attached at the distal ends of two or more of the tilt bases in some embodiments.

3 Claims, 4 Drawing Sheets

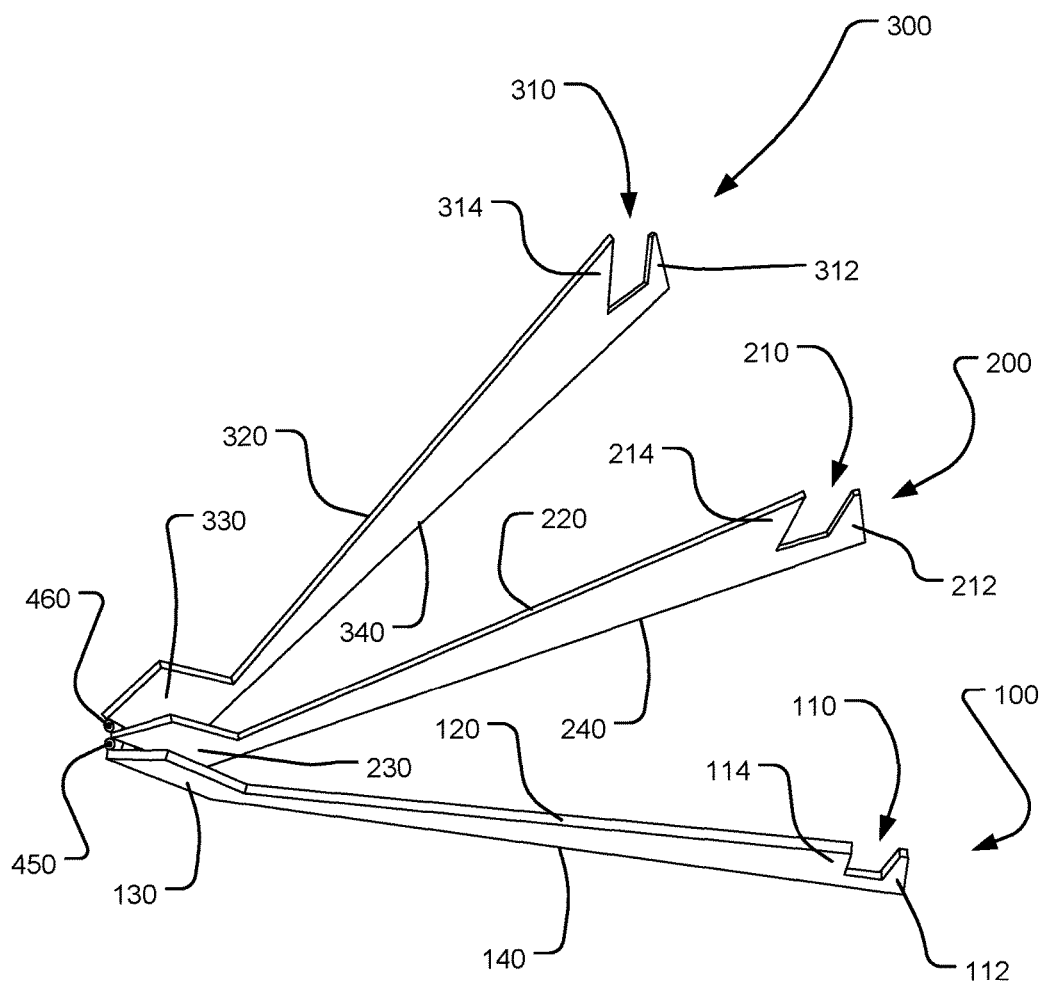
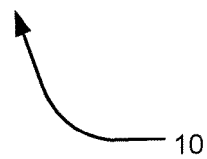

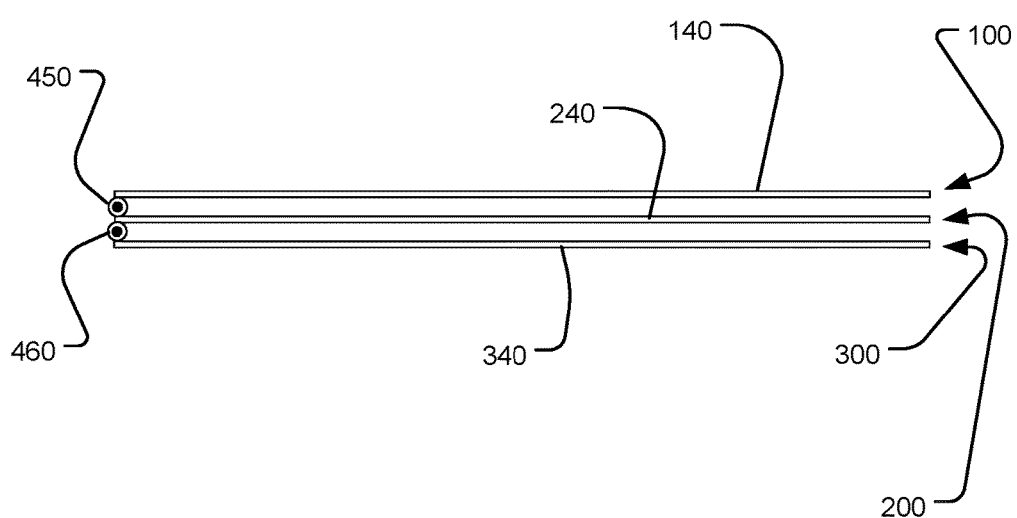
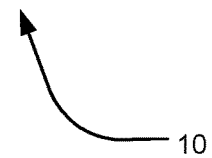
FIG. 3

COLLAPSIBLE PAN TILT

TECHNICAL FIELD

The present invention relates generally to the field of kitchen tools, and more specifically, to a collapsible pan tilt that can be used to hold pans, dishes, plates, trays and other items at an angle/tilt.

BACKGROUND

There are a wide variety of kitchen pots, pans, plates, trays, and other cooking/serving related items available in today's kitchens. There are many instances when it is extremely useful while cooking and/or serving to hold one or more of those items at an angle/tilt. One common way to address this need is to have the chef and/or server stand there and hold the item at an angle/tilt. This is less than an ideal solution, as often the chef's/server's hands are needed to interact with the item while it is at an angle/tilt (for example, to dip out excess oil that collects in the lower portion of the tilted item). Additionally, although different people can physically hold the item at an angle/tilt for different lengths of time, everyone eventually tires and must set the item down (usually on a flat surface).

What is needed is a device that provides a surface upon which an item can rest, and that surface needs to be at an angle/tilt. The device should maintain the item in place on the tilted surface. Furthermore, as space is often at a premium in kitchens, it would be a valuable feature if the device were made to be collapsible so it could be easily stored between uses. Furthermore, as items that need to be tilted are often hot and/or heavy, the device should be constructed out of material(s) that can withstand heat and are sturdy.

SUMMARY

One embodiment of the present invention comprises two or more tilt bases connected to one another by a base hinge. The tilt bases can be relatively long and narrow members that have a flat bottom surface and an angled/tilted top surface. At a proximal end of the tilt bases can be a base hinge connecting the two or more tilt bases together. In one embodiment, a single base hinge connects all of the tilt bases together, in another embodiment, multiple base hinges can be utilized. In yet another embodiment, the total number of tilt bases exceeds the total number of base hinges by one. Between the tilted top surface and the hinge connections, a pan stop can be incorporated to stop the pan or other item that is placed on the tilted top surface from sliding down off of the collapsible pan tilt. On the distal ends of the tilt bases, a lid holder can be incorporated in two or more of the tilt bases. In another embodiment, no lid holders are included. Additionally, one or more of the hinges can be attached at the distal ends of two or more of the tilt bases in some embodiments.

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein:

FIG. 1 illustrates a top perspective view of an exemplary embodiment of a collapsible pan tilt;

FIG. 3 illustrates a bottom plan view of an exemplary embodiment of a collapsible pan tilt.

DETAILED DESCRIPTION

Figure 2:
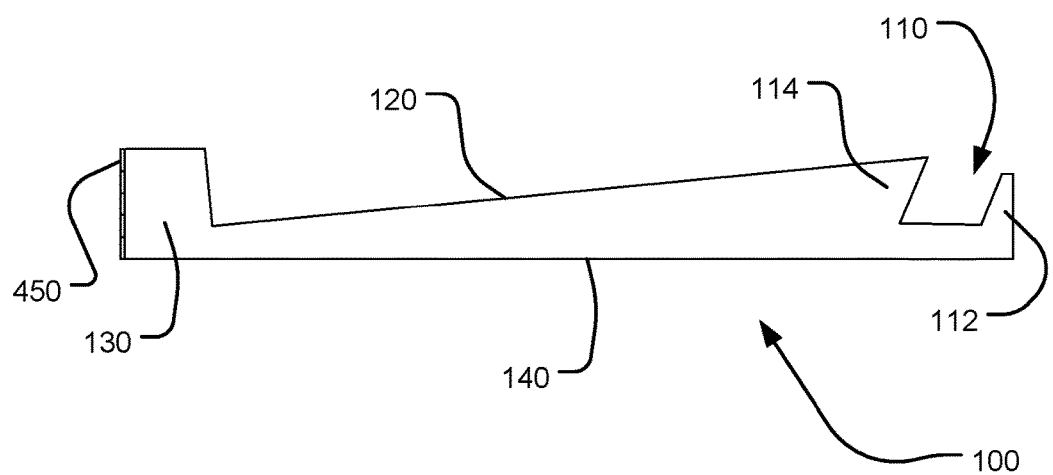
FIG. 2 illustrates a side elevation view of an exemplary embodiment of a collapsible pan tilt.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below and in the accompanying Figures. The following detailed description provides a review of the drawing Figures in order to provide a thorough understanding of, and an enabling description for, these embodiments. One having ordinary skill in the art will understand that in some cases well-known structures, methods and functions have not been shown or described in detail to avoid unnecessarily obscuring the description of the embodiments.

Referring now to the drawings, FIG. 1 illustrates a top perspective view of an exemplary embodiment of a collapsible pan tilt 10. In order not to obfuscate the pan tilt 10, the collapsible pan tilt 10 is illustrated without a pan, pot, lid, or other item in use thereon. For an example of the pan tilt 10 in use, see FIG. 4.

A collapsible pan tilt 10 can comprise two or more tilt bases 100, 200 and 300. In the embodiment illustrated in FIG. 1, the collapsible pan tilt 10 has three tilt bases, in other embodiments, the number of tilt bases can be fewer than or more than three. Each of the plurality of tilt bases 100, 200 and 300 is similar to the others in size and shape.

Each tilt base 100, 200 and 300 has a proximal end and a distal end and extends longitudinally between the two. The tilt base bottom surface 140, 240 and 340 comprises the bottom edge of the tilt base and is that surface upon which the tilt base rests when in use. Thus, the tilt base bottom surfaces 140, 240 and 340 should be generally flat and in the same plane with one another.

Opposite the tilt base bottom surfaces 140, 240 and 340 are the tilt base top surfaces 120, 220 and 320. Rather than being parallel to the bottom surfaces, the tilt base top surfaces 120, 220 and 320 are angled/tilted relative thereto. In the embodiment illustrated in FIG. 1, near the distal ends of the tilt bases 100, 200 and 300, the tilt bases are relatively tall and the distance between the top surface and bottom surface decreases (i.e, the tilt bases decrease in height) as you move back towards the proximal ends thereof.

The proximal end of each tilt base 100, 200 and 300 comprises a pan stop 130, 230 and 330. The pan stops rise up from the tilt base top surfaces 120, 130 and 140 and form an impediment to whatever item is placed on the top surfaces in order to keep the item from sliding off of the collapsible pan tilt 10.

The distal end of each tilt base 100, 200 and 300 can comprise a lid holder 110, 210 and 310. Each lid holder is a cutout defined by an outer rest 112, 212 and 312 and an inner rest 114, 214 and 314. It is preferable that the cutouts have angled sides so as to more easily trap a pin lid, pot lid, or other item upright therein. See FIG. 4 for an example of a pan lid being held upright in a collapsible pan tilt. In some embodiments, the lid holders 110, 210 and 310 may be differently shaped. In yet other embodiments, the lid holders may not be present in one or more of the tilt bases 100, 200 and 300.

In the embodiment illustrated in FIG. 1, the collapsible pan tilt 10 utilizes three tilt bases 100, 200 and 300. The first tilt base 100 is hingeably attached to the second tilt base 200 by the first base hinge 450. Similarly, the second tilt base 200 is also attached to the third tilt base 300 by the second base hinge 460. The plurality of base hinges 450 and 460 provide a hinged connection between the tilt bases so that they can swing open from one another. Contrast the more open configuration illustrated in FIG. 1 with the more closed configuration illustrated in FIG. 3. The base hinges 450 and 460 not only allow the collapsible pan tilt 10 to adjust in size for various size pans, pots, and other items, but also allow the user to vary the angle somewhat of the item on the collapsible pan tilt 10 by changing the degree of spread between the tilt bases. Furthermore, the base hinges 450 and 460 allow the collapsible pan tilt 10 to be collapsed for storage (see FIG. 3 for an example of a mostly closed collapsible pan tilt 10).

The embodiment illustrated in FIG. 1 only shows the plurality of base hinges 450 and 460 attached at the proximal ends of the tilt bases 100, 200 and 300. In other embodiments, one or more base hinges can be attached at the distal ends of the tilt bases. In yet other embodiments, all of the base hinges are attached only at the distal ends of the tilt bases 100, 200 and 300. In embodiments where some of the base hinges are attached at the proximal ends and some at the distal ends, it can be useful to alternate the base hinge location so that the resulting collapsible pan tilt 10 has a zigzag appearance when viewed from above.

FIG. 2 illustrates a side elevation view of an exemplary embodiment of a collapsible pan tilt 10. In this view, it is easy to see that the tilt base top surface 120 is tilted downwards from near the distal end of the tilt base 100 to near the proximal end of the tilt base 100 by the pan stop 130. In some embodiments, the tilt angle of the tilt base top surface 120 (and the top surfaces of the other tilt bases) is relatively small as illustrated in FIG. 2. In yet other embodiments, the tilt angle is larger or smaller than that shown in FIG. 2.

FIG. 3 illustrates a bottom plan view of an exemplary embodiment of a collapsible pan tilt 10 in a mostly collapsed configuration. As this view is taken from below the pan tilt 10, the only portions of the plurality of tilt bases 100, 200 and 300 that are visible are the plurality of pan tilt bottom surfaces 140, 240 and 340. Note that at the proximal ends of the tilt bases 100, 200 and 300, the bottom portion of each of the plurality of base hinges 450 and 460 are shown. In this embodiment, the pan stop portions of the tilt bases are integratedly connected to one another through the base hinges. In other embodiments, the base hinges are separate components that are then attached to each of the tilt bases. In yet another embodiment, a single base hinge can be used with separate hinge arms for each tilt base.

Figure 4:
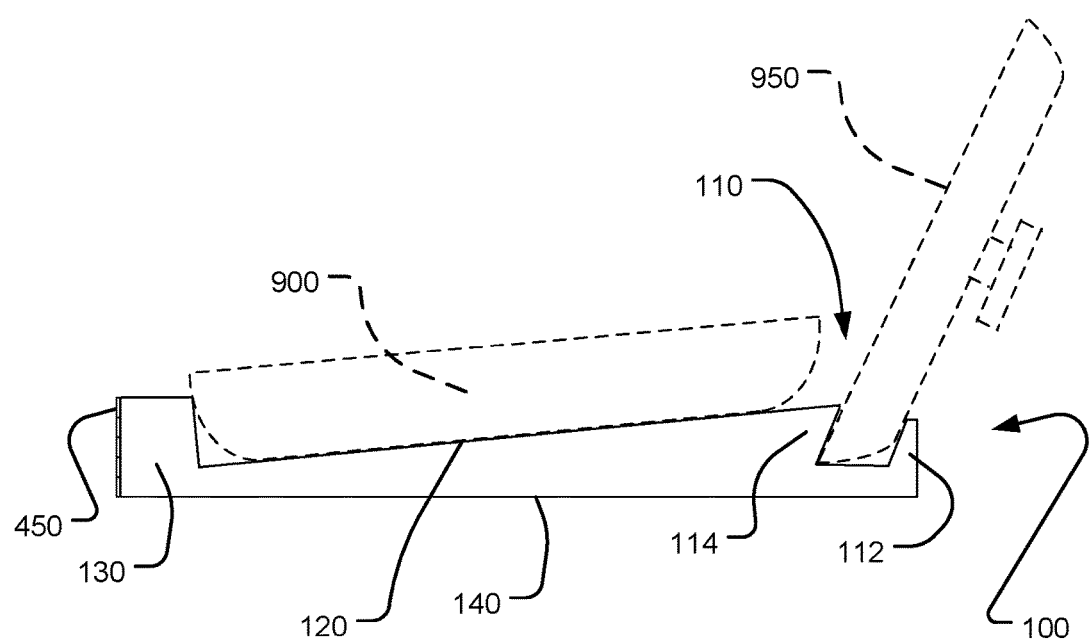
FIG. 4 illustrates a side elevation view of an exemplary embodiment of a collapsible pan tilt including a pan and lid in place thereon.

FIG. 4 illustrates a side elevation view of an exemplary embodiment of a collapsible pan tilt 10 including a sample pan 900 and sample lid 950 in place thereon. Note that the pan 900 is resting on the tilt base top surface 120. Since the top surface 120 is angled, the pan is therefore held in a tilted/angled orientation as well. The functionality of the pan stop 130 can be seen more clearly in this view as the pan 900 is stopped from sliding off of the end of the collapsible pan tilt 10 by contact with the pan stop 130.

The illustration in FIG. 4 also shows a pan lid 950 in place within the pan holder 110. Note how the lid contacts both the outer rest 112 and the inner rest 114 and is held therebetween. When two of the pan holders 110 are used, the lid is held quite securely.

While particular embodiments of the invention have been described and disclosed in the present application, it should be understood that any number of permutations, modifications, or embodiments may be made without departing from the spirit and scope of this invention. Accordingly, it is not the intention of this application to limit this invention in any way except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above "Detailed Description" section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

In light of the above "Detailed Description," the Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The above specification, examples and data provide a description of the structure and use of exemplary implementations of the described articles of manufacture and methods. It is important to note that many implementations can be made without departing from the spirit and scope of the invention.

What is claimed is:

1. A collapsible pan tilt for holding an item above a surface and at an angle to the surface, comprising:

a plurality of two or more tilt bases, each tilt base extending longitudinally from a proximal end to a distal end, each tilt base further comprising:

a tilt base bottom surface comprising a bottom edge of the tilt base upon which at least a portion of the tilt base rests when in use;

a tilt base top surface opposite the tilt base bottom surface, and, when moving from the proximal end to the distal end, a distance between the top surface and the bottom surface increases, wherein the tilt base top surfaces are flat between the proximal end and the distal end of each tilt base: and the proximal end comprising a pan stop rising up from the tilt base top surface at the proximal end and forming an impediment to any item placed on the top surface in order to keep said item from sliding off of the collapsible pan tilt; and a first base hinge hingeably attaching a first tilt base proximal end to a second tilt base proximal end such that the collapsible pan tilt can be folded together for storage, and extended outwards for use in holding said item at the angle relative to the surface upon which the collapsible pan tilt is resting, and a lid holder disposed at the distal end, the lid holder comprising a cutout in the tilt base extending between the top surface and the bottom surface of the tilt base, the cutout defined by an outer rest and an inner rest, wherein a lid can be at least partially placed in the lid holder and held securely therein between the outer rest and the inner rest and a second base hinge hingeably attaching the second tilt base proximal end to a third tilt base proximal end such that the collapsible pan tilt can be folded together for storage, and extended outwards for use in holding said item at the angle relative to the surface upon which the collapsible pan tilt is resting.

2. The collapsible pan tilt of claim 1, wherein the tilt base bottom surfaces of the plurality of tilt bases are generally flat and in the same plane with one another.

3. The collapsible pan tilt of claim 1 further comprising: the distal end of each tilt base comprising a lid holder, the lid holder comprising a cutout in the tilt base defined by an outer rest and an inner rest; and wherein a lid can be placed in the lid holder and held securely therein between the outer rest and the inner rest.

* * * * *